United States Patent
Matha et al.

(12) 
(10) Patent No.: US 11,660,983 B2
(45) Date of Patent: May 30, 2023

(54) SAFETY DEVICE FOR MOTOR VEHICLE

(71) Applicant: FAURECIA Sièges d'Automobile, Nanterre (FR)

(72) Inventors: Thierry Matha, Bretigny sur Orge (FR); Farouk Bouzid, Bretigny sur Orge (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 316 days.

(21) Appl. No.: 17/017,329

(22) Filed: Sep. 10, 2020

(65) Prior Publication Data

US 2021/0070199 A1    Mar. 11, 2021

(30) Foreign Application Priority Data

Sep. 11, 2019    (FR) ...................................... 1910011

(51) Int. Cl.
*B60N 2/02*    (2006.01)
*B60N 2/90*    (2018.01)
*B60N 2/22*    (2006.01)

(52) U.S. Cl.
CPC ............. *B60N 2/0232* (2013.01); *B60N 2/22* (2013.01); *B60N 2/90* (2018.02); *B60N 2002/981* (2018.02)

(58) Field of Classification Search
CPC .......... B60N 2/0232; B60N 2/90; B60N 2/22; B60N 2/0244; B60N 2002/981; B60N 2002/0272
USPC ......................................................... 701/49
See application file for complete search history.

(56) References Cited

U.S. PATENT DOCUMENTS

| | | | |
|---|---|---|---|
| 6,441,576 B1 * | 8/2002 | Marin-Martinod ...... | B60N 2/34 297/65 |
| 6,526,643 B1 | 3/2003 | Renault | |
| 6,583,596 B2 * | 6/2003 | Nivet ..................... | B60N 2/995 297/65 |
| 6,871,120 B1 | 3/2005 | Nivet | |
| 7,546,215 B2 * | 6/2009 | Muhammad ..... | B64D 11/06395 702/94 |
| 7,911,163 B2 * | 3/2011 | Nivet ................... | B64D 11/064 318/268 |
| 9,616,774 B2 * | 4/2017 | Itou ..................... | B60N 2/0244 |
| 11,299,075 B2 * | 4/2022 | Jones .................... | B60N 2/502 |

(Continued)

FOREIGN PATENT DOCUMENTS

| | | |
|---|---|---|
| FR | 2806674 A1 | 9/2001 |
| FR | 2816184 A1 | 5/2002 |
| FR | 2861339 A1 | 4/2005 |

OTHER PUBLICATIONS

French Search Report for FR1910011 dated May 18, 2020, BET200209 FR, 8 pages, (No English Translation Available).

*Primary Examiner* — Mark R Wendell
(74) *Attorney, Agent, or Firm* — Barnes & Thornburg LLP

(57) ABSTRACT

A safety device for a motor vehicle seat comprising: a seat, an electric motor for moving the seat or a part of the seat, and a control device configured for measuring/detecting at least one operating parameter of the motor among the voltage and/or the current of the motor and/or the speed of the motor, when the seat or the part of the seat is moving along a movement path when actuated by the motor, the control device being configured for ensuring that the motor is stopped when the at least one parameter of the current measurement crosses at least one threshold.

26 Claims, 7 Drawing Sheets

(56) References Cited

U.S. PATENT DOCUMENTS

| | | | |
|---|---|---|---|
| 2002/0113478 A1* | 8/2002 | Kasahara | B64D 11/0641 297/362.11 |
| 2005/0088129 A1 | 4/2005 | Robert | |
| 2011/0043157 A1 | 2/2011 | Yuasa | |
| 2015/0306977 A1* | 10/2015 | Wu | B60N 2/0244 318/490 |

* cited by examiner

SAFETY DEVICE FOR MOTOR VEHICLE

PRIORITY CLAIM

This application claims priority to French Application No. FR 19 10011, filed Sep. 11, 2019, which is expressly incorporated by reference herein.

BACKGROUND

The present disclosure relates to a safety device for a motor vehicle seat, as well as to a method for enhancing the safety of a motor vehicle seat. The present disclosure relates to the field of safety devices for a motor vehicle seat, in particular, but not limited to, those with an anti-pinch function.

SUMMARY

According to the present disclosure, a safety device for a motor vehicle seat is comprises a seat, an electric motor for moving the seat or a part of the seat, and a control device configured for measuring/detecting at least one operating parameter of the motor among the voltage and/or the current of the motor and/or the speed of the motor, when the seat or the part of the seat is moving along a movement path when actuated by the motor, the control device being configured for ensuring that the motor is stopped when the at least one parameter of the current measurement crosses at least one threshold.

In illustrative embodiments, the at least one threshold has a plurality of determined values associated with different positions of the seat or part of the seat along the movement path, at least in a movement direction of the seat or part of the seat, the control device being configured for, in at least one monitoring mode, detecting/measuring the current position of the seat or part of the seat along the movement path during its actuation by the motor, when the seat or part of the seat is moving in the movement direction, and comparing, for each of the different positions of the seat or part of the seat along the movement path, the current measurement of the at least one operating parameter of the motor with the value of the threshold associated with the operating parameter, determined for the position associated with the current position of the seat or part of the seat, and so as to set off an alarm and/or preferably stop the motor when the at least one threshold is crossed.

In illustrative embodiments, a method for enhancing the safety of a motor vehicle seat comprises a seat, an electric motor for moving the seat or a part of the seat, the method measuring at least one operating parameter among the voltage and/or the current of the motor and/or the speed of the motor when the seat or the part of the seat is moving along a movement path when actuated by the motor, the method comprising at least one threshold having a plurality of determined values associated with different positions of the seat or part of the seat along the movement path, at least in a movement direction of the seat or part of the seat, and wherein the seat is made more safe by a control device which, in at least one monitoring mode, ensures the detection/measurement of the current position of the seat or part of the seat along the movement path during its actuation by the motor, and compares, for each of the different positions of the seat or part of the seat along the movement path, the current measurement of the at least one operating parameter with the value of the threshold associated with the operating parameter, determined for the position associated with the current position of the seat or part of the seat, and so as to set off an alarm and/or preferably stop the motor when the at least one threshold is crossed.

According to one embodiment of the safety-enhancing method, the determination of the values of at least one threshold, at the different positions along the movement path, is obtained during a calibration prior to the monitoring mode, by implementing the following steps:

a measurement step a) in which the at least one parameter chosen among the voltage or the current or the speed of the motor during at least one movement of the seat or part of the seat is measured in the different positions of the seat or part of the seat along the movement path, at least in the movement direction, a step b) of determining the determined values of the at least one threshold in relation to the different positions of the seat, in the movement direction, by applying a tolerance margin relative to the values of the operating parameter detected/measured during step a).

In illustrative embodiments, the control device can thus have calibration means configured for determining the determined values of the at least one threshold along the movement path, at the different positions of the seat or part of the seat along the movement path, at least in the movement direction, in at least one calibration mode of the control device, prior to the monitoring mode, by implementing the following steps:

a measurement step a) in which the at least one operating parameter chosen among the voltage and/or the current and/or the speed of the motor is measured during at least one movement of the seat or part of the seat in the different positions of the seat or part of the seat along the movement path, at least in the movement direction, a step b) of determining the determined values of the at least one threshold in relation to the different positions of the seat, in the movement direction, by applying a tolerance margin relative to the values of the operating parameter detected/measured during step a).

In illustrative embodiments, the control device comprises a microcontroller recording the measurements during step a), using a sampling period, along the movement path of the seat or part of the seat, that is less than the time required by the seat (or part of the seat) to travel the movement path, by a ratio of 10, or even by a ratio of 100.

In illustrative embodiments, the sampling period Te1 used on the movement portions near the two end-of-movement positions is of a much smaller value than the sampling period Te2 used on the intermediate portion between the two portions near the two ends-of-movement (P0 and PN), in particular the Te2/Te1 ratio is greater than or equal to 3, or even greater than or equal to 5, or even greater than or equal to 10.

In illustrative embodiments, the tolerance margin in step b) is determined by calculation, by applying a multiplying factor to the measurements acquired in step a):

greater than 1, between 1.05 and 1.30, for determining an upper threshold, less than 1, between 0.7 and 0.95, for determining a lower threshold.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 shows a graph representing the intensity profile of the motor when the seat (or part of the seat) is actuated in a first direction of rotation on the movement path of the seat, the graph showing the motor intensity on the ordinate and on the abscissa the position of the seat or part of the seat on the movement path, under normal conditions of use (fluid kinematics and without pinching), this intensity profile enabling calibration of the device for the determination of the first threshold (upper threshold and/or lower threshold) associated with the first movement direction;

FIG. 2 shows a graph representing the intensity profile of the motor when the seat (or part of the seat) is actuated in a second direction of rotation (opposite to the first direction) on the movement path of the seat, the graph showing the motor intensity on the ordinate and on the abscissa the position of the seat or part of the seat on the movement path (fluid kinematics and without pinching), this intensity profile enabling calibration of the device for the determination of the second threshold (upper threshold and/or lower threshold) associated with the second movement direction;

Figure 5:
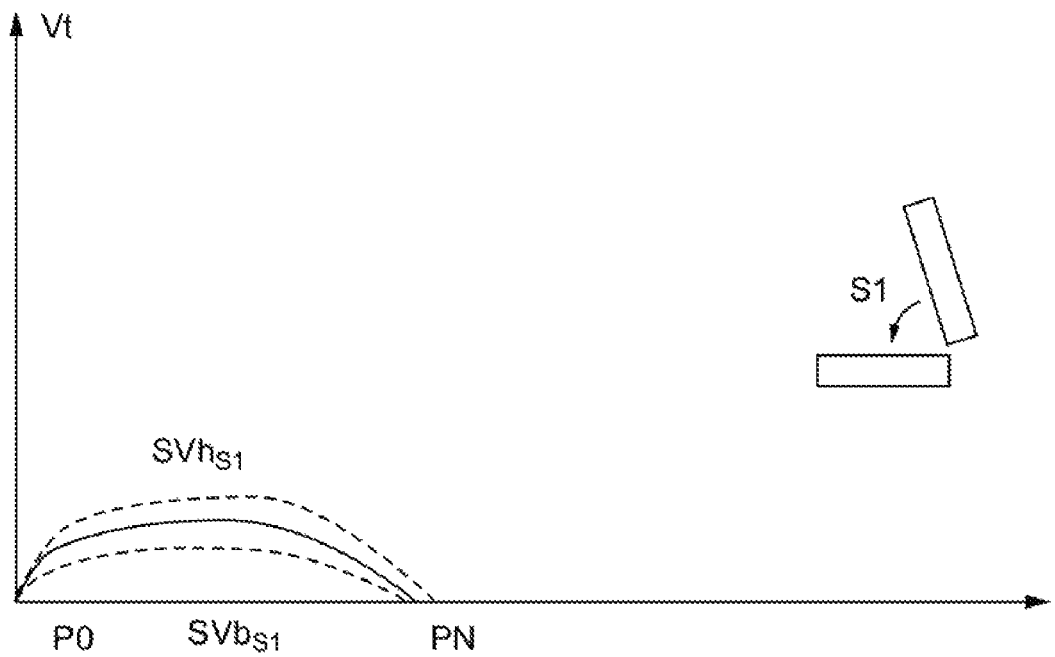
Figure 6:
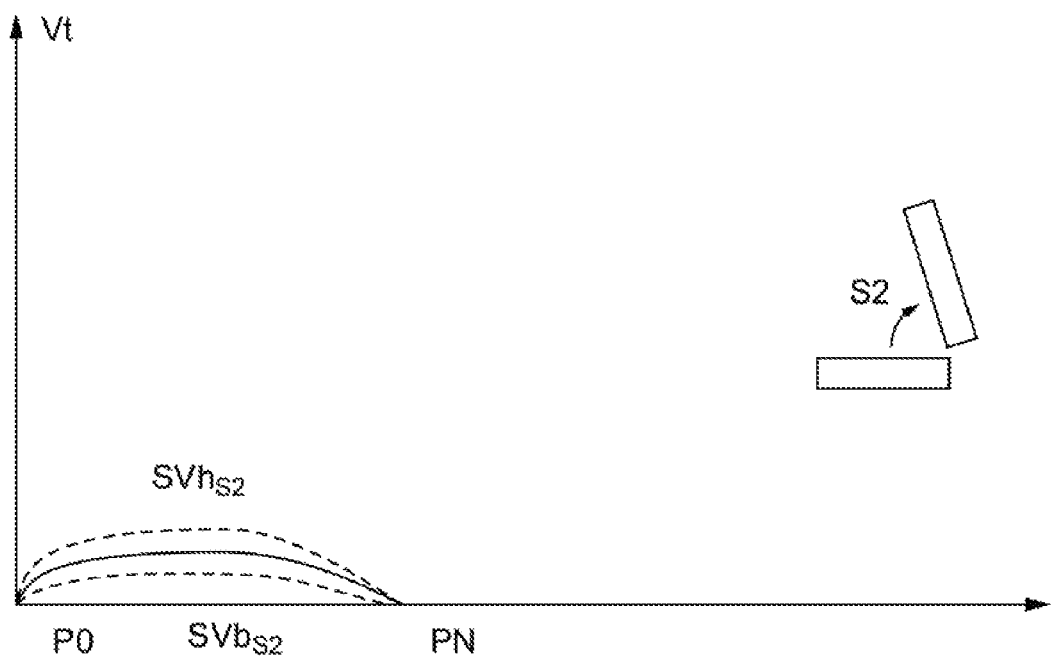
Figure 7:
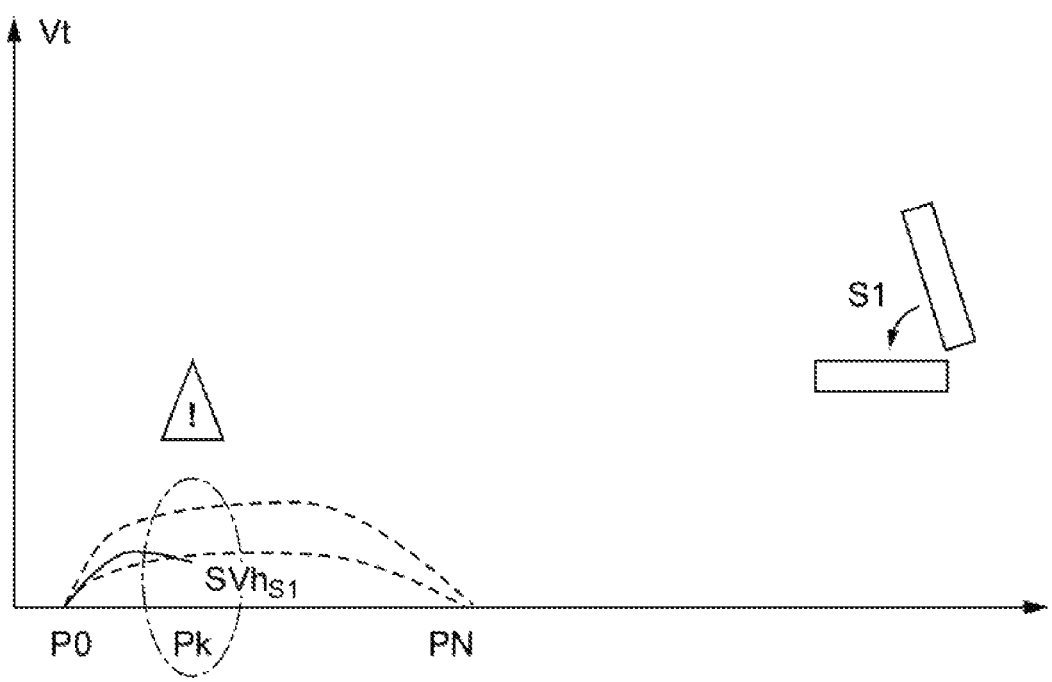
Figure 8:
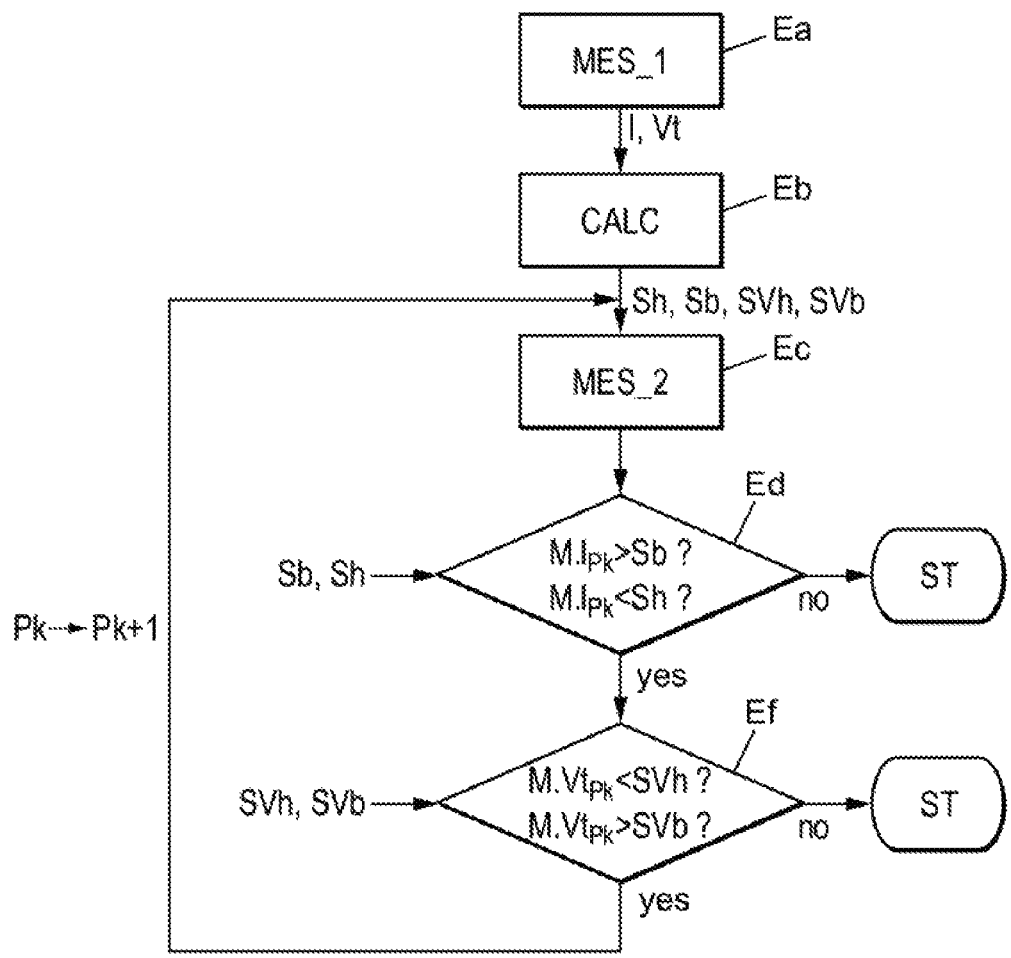
Figure 9:
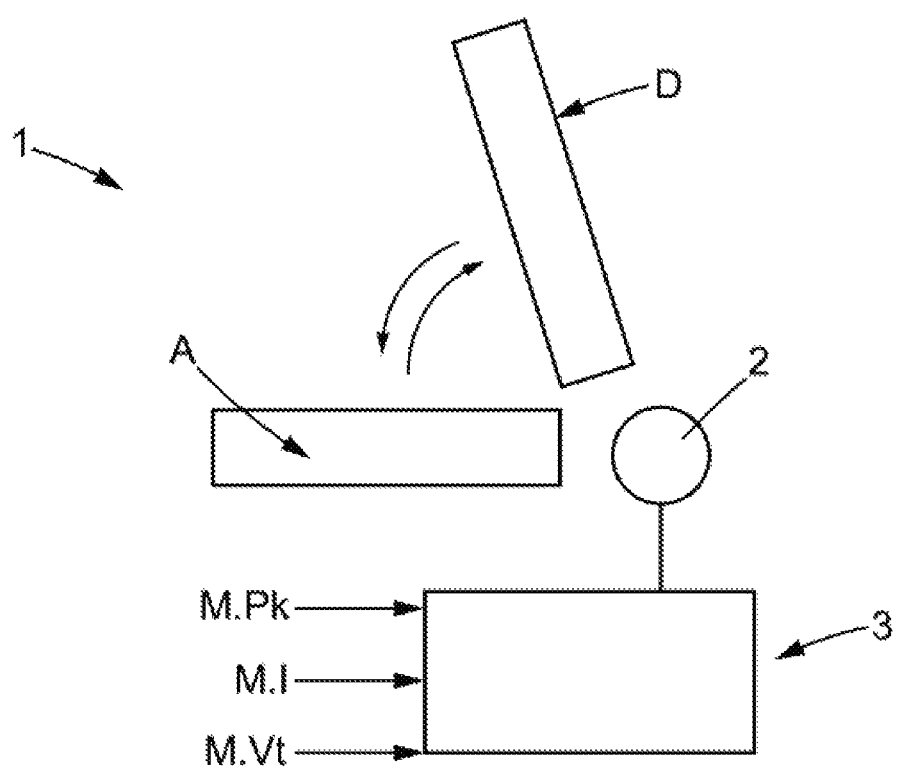
Figure 10:
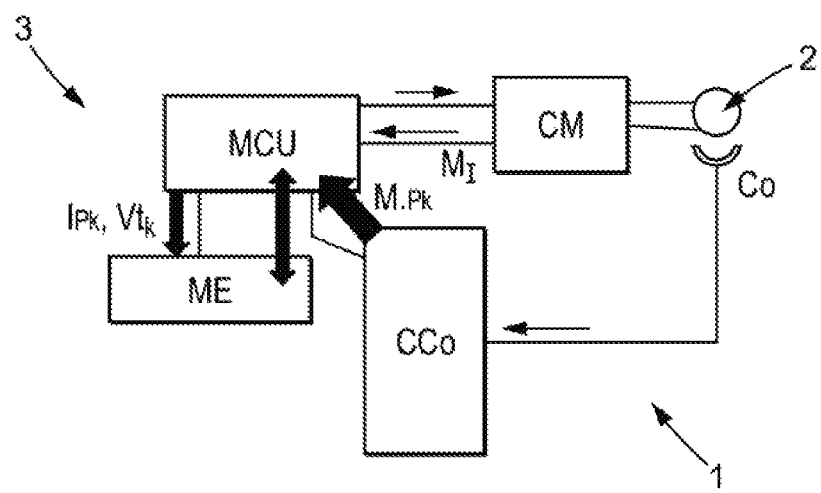
Figure 11:
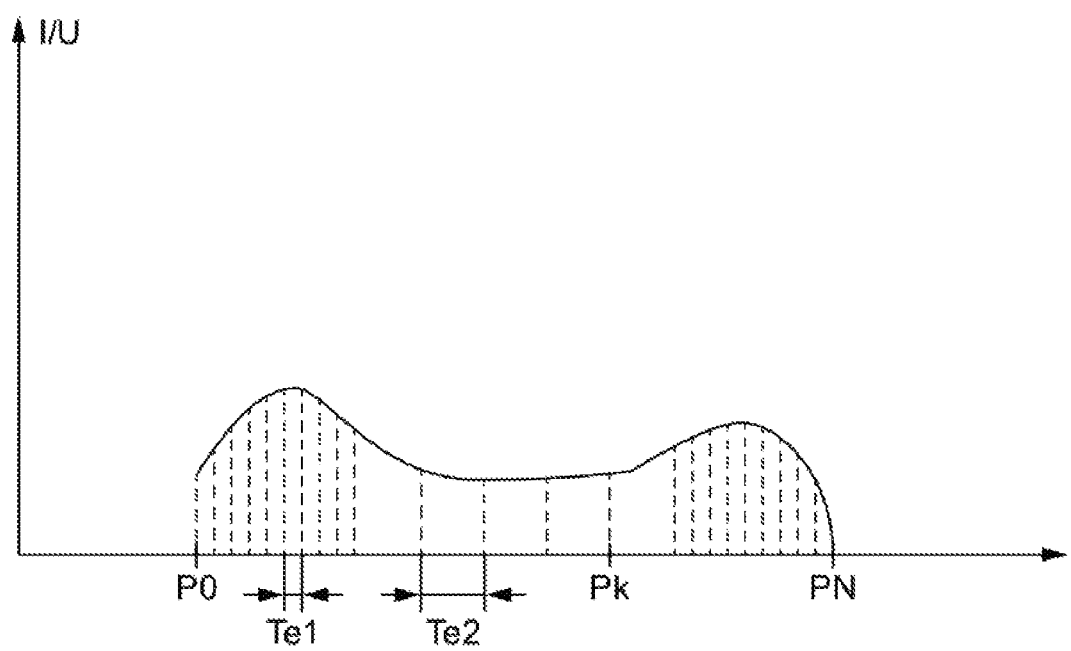

FIG. 5 shows a graph representing the speed profile of the motor when the seat (or part of the seat) is actuated in a first direction of rotation on the movement path of the seat, the graph showing the speed of the motor on the ordinate and on the abscissa the position of the seat or part of the seat on the movement path, in normal conditions of use (fluid kinematics and without pinching), this speed profile enabling calibration of the device for the determination of the first threshold (upper threshold and/or lower threshold) associated with the first movement direction;

FIG. 6 shows a graph representing the speed profile of the motor when the seat (or part of the seat) is actuated in a second direction of rotation on the movement path of the seat, the graph showing the speed of the motor on the ordinate and on the abscissa the position of the seat or part of the seat on the movement path, in normal conditions of use (fluid kinematics and without pinching), this speed profile enabling calibration of the device for the determination of the second threshold (upper threshold and/or lower threshold) associated with the second movement direction;

FIG. 7 shows a graph representing the speed profile of the motor when the seat (or part of the seat) is actuated in the first direction of rotation on the movement path of the seat, in the monitoring mode of the control device, the current speed measurement at the current position Pk falling below the lower threshold of the first threshold, causing the motor to stop;

FIG. 8 shows a functional diagram of the operation of the control device, including the calibration phase for which the at least one threshold is determined, and the monitoring mode during which the device measures and controls two operating parameters of the motor—intensity and speed—with application of the upper threshold and lower threshold for each of these two operating parameters, as one possible example;

FIG. 9 shows a schematic diagram of a safety device according to one embodiment of the present disclosure;

FIG. 10 illustrates a possible example of the architecture of the safety device, and in particular of the control device, not only enabling control of the motor in monitoring mode where the control device compares in real time the current measurement of the at least one operating parameter of the motor with the value of the threshold associated with the operating parameter determined for the position associated with the current position of the seat or part of the seat, and so as to set off an alarm and/or preferably stop the motor when the at least one threshold is crossed, but also, prior to this monitoring mode, implementing a calibration mode with automatic learning of the values of the operating parameter(s) (intensity or speed) of the motor as a function of the positions of the seat or part of the seat; and FIG. 11 illustrates a possibility for improved sampling during the implementation by the calibration means of automatic learning of the values of the operating parameters of the motor, such as the intensity as a function of the position of the part of the seat (or seat) along the movement path of the seat.

DETAILED DESCRIPTION

The drawings and description below contain, for the most part, elements that are certain in nature. They therefore can serve not only to provide a better understanding of this disclosure, but also to contribute to its definition, where appropriate.

The present disclosure relates to a safety device for a motor vehicle seat comprising a seat 1, an electric motor 2 for moving the seat or part of the seat, a control device configured for measuring/detecting at least one operating parameter of the motor when the seat or the part of the seat is moving along a movement path when actuated by the motor, the control device being configured (at least in a monitoring mode) for ensuring that the motor is stopped when the at least parameter crosses at least one threshold.

The at least one operating parameter of the motor is chosen in particular among the voltage U and/or the current I of the motor and/or the speed Vt of the motor, or the derivative of these parameters (voltage U and/or intensity I and/or speed) in relation to the position of the seat or part of the seat. The measurement of this operating parameter may be a direct measurement or an indirect measurement. For example, the speed may be obtained by a time derivative of the measurement information for the current position $M_{PK}$.

In a noteworthy manner and according to the present disclosure, the at least one threshold has a plurality of determined values associated with different positions P0 to PN of the seat or part of the seat along the movement path, at least in a movement direction of the seat or part of the seat.

In other words, and unlike the cited state of the art for which the value of the recorded intensity threshold is unique (in other words independent of the position of the part of the seat on the movement path), the present disclosure teaches to record a plurality of determined values associated with different positions of the seat or part of the seat along the movement path.

Also in a noteworthy manner, the control device is configured for, in at least one monitoring mode, detecting/measuring the current position Pk of the seat or part of the seat along the movement path during its actuation by the motor, when the seat or part of the seat is moving in the movement direction, and comparing, for each of the different positions P0 to PN of the seat or part of the seat along the movement path, the current measurement (for example $M.I_{PK}$ for the intensity or $M.Vt_{PK}$ for the speed) of the at least operating parameter of the motor with the threshold value (associated with the operating parameter) determined for the position associated with the current position Pk of the seat or part of the seat, and so as to set off an alarm, and/or preferably stop the motor when the at least one threshold is crossed. The alarm triggered by the control device may be visual and/or audible.

In monitoring mode, the control device therefore compares the current measurement of the at least one operating parameter of the motor with the threshold value determined for the position associated with the current position Pk of the seat or part of the seat, and sets off an alarm, and/or preferably stops the motor when the at least one threshold is crossed.

The present disclosure also relates to a method for enhancing the safety of a motor vehicle seat comprising: a seat, an electric motor for moving the seat or a part of the seat, the method measuring at least one operating parameter in particular among the voltage U and/or the intensity of the current I of the motor and/or the speed Vt of the motor when the seat or the part of the seat is moving along a movement path when actuated by the motor.

The method comprises the application of at least one threshold having a plurality of determined values associated with different positions P0 to PN of the seat or part of the seat along the movement path, at least in one movement direction of the seat or part of the seat, and in the method the seat is made more safe by a control device which, in at least one monitoring mode, ensures the detection/measurement of the current position P of the seat or part of the seat along the movement path during its actuation by the motor, and compares, for each of the different positions of the seat or part of the seat along the movement path, the current measurement of the at least one operating parameter with the threshold value determined for the position associated with the current position of the seat or part of the seat, and so as to cause the motor to stop when the at least one threshold is crossed.

Thus, and whether it is the safety device or the safety-enhancing method, the determined values of the at least one threshold associated with the different positions of the seat or part of the seat can thus be variable, depending on the position of the seat or part of the seat along the movement path of the seat or part of the seat, and can thus be advantageously adapted, during a calibration step, for any type of kinetics of the seat (or part of the seat) in all operating phases of the kinematics of the seat (or part of the seat) on the movement path.

It should also be noted that, even among seats of the same type having the same kinematics of the seat or part of the seat, there may be variations between the operating profiles of the operating parameters during normal use which are inherent to manufacturing. Furthermore, at least according to one embodiment, the present disclosure can allow adapting the determined values of the threshold specifically to each seat.

More particularly, and unlike the previously mentioned state of the art, it becomes possible to distinguish, by distinct threshold values, the different phases of the kinematics of the seat (or part of the seat) for which the values of the operating parameters of the motor (voltage and/or current and/or speed) show strong differences during normal operation (without pinching, without jamming).

As an example, it is possible to distinguish the phases for which the work of the motor is significant (non-limiting examples: the starting phases, the phases in which the motor is working against gravity to raise a portion of the seat, or when the motor is working in order to apply mechanical locking) from the phases of the motor for which the work of the motor is lower (for example the phases of the motor during normal operation, in particular the phases of the motor in which the motor does not have to work against gravity, or is even assisted by gravity or by the action of a return spring of a mechanism).

The safety device (or safety-enhancing method) according to the present disclosure finds particular application as an anti-pinch device, especially including for seats exhibiting strong variations in the motor current during movement of the seat or part of the seat.

According to one embodiment, the at least one operating parameter may comprise at least the voltage or the intensity of the current of the electric motor. Again, the operating parameter may comprise, in addition to the voltage or current of the electric motor, the speed of the motor.

According to one embodiment, the at least one threshold comprises at least one upper threshold, the control device setting off the alarm and/or stopping the motor when the operating parameter measured/detected at the current position exceeds the upper threshold. For example, and when the parameter is the intensity I, the exceeding of an upper threshold (overcurrent) at the current position can be an indication of blockage (pinching).

According to one embodiment, the at least one threshold comprises at least one lower threshold, the control device setting off the alarm and/or preferably stopping the motor when the operating parameter measured/detected at the current position falls below the lower threshold. For example when, in addition to exceeding the upper threshold for the intensity, the operating parameter comprises the speed of the motor and this speed parameter falls below a lower threshold, namely rising above the intensity upper threshold and falling below the speed lower threshold, it is possible to reliably identify blockage of the kinematics: the blockage anticipating a drop in the speed parameter combined with an increase in the current intensity parameter.

Again according to one embodiment, the threshold may comprise at least one upper threshold and at least one lower threshold, the control device setting off the alarm and/or preferably stopping the motor when the operating parameter measured/detected at the current position is outside the range between the lower threshold and the upper threshold.

It should also be noted that very often the work of the motor is not symmetrical in the two directions of movement of the seat or part of the seat, for the kinematics of the seat or part of the seat over the movement path. As an example, and if the movement actuated by the motor includes the folding down (in a first movement direction of the part of the seat) or the raising of a tiltable backrest (in a second movement direction), the work of the motor can generally be greater when raising than when folding down, or at the very least is often asymmetrical.

At least according to one embodiment, the present disclosure can provide that the at least one threshold comprises at least a first threshold associated with a first movement direction S1, and at least a second threshold S2 associated with the second movement direction.

The control device is then configured for, in the at least one monitoring mode: detecting/measuring the current position of the seat or part of the seat along the movement path, during its actuation by the motor; and comparing, for each of the different positions of the seat or part of the seat along the movement path: the current measurement of the at least one operating parameter with the first threshold value determined for the position associated with the current position of the seat or part of the seat when the seat or part of the seat is moving along the first movement direction S1, or the current measurement of the at least one operating parameter with the second threshold value determined for the position associated with the current position of the seat or part of the seat when the seat or part of the seat is moving along the second movement direction S2, and so as to set off the alarm and/or stop the motor when the at least one threshold—first threshold or second threshold—is crossed.

To this end, the control device may have calibration means configured for determining the values of the at least one threshold along the movement path, in the different positions of the seat or part of the seat along the movement path, at least in the movement direction, in at least one calibration mode of the control device, prior to the monitoring mode, by implementing the following steps: a measurement step a) in which the at least one operating parameter chosen among the voltage and/or the intensity of the current and/or the speed of the motor during at least one movement of the seat or part of the seat is measured in the different positions of the seat or part of the seat along the movement path, at least in the movement direction, a step b) of determining the determined values of the at least one threshold in relation to the different positions of the seat, in the movement direction, by applying a tolerance margin relative to the values of the operating parameter detected/measured during step a).

Calibration

The at least one threshold may thus advantageously be adapted for any type of kinematics of the seat (or part of the seat) in all operating phases of the kinetics of the seat (or part of the seat) on the movement path. Even more, the values of the at least one threshold can be adapted to each seat, even if the seats (or parts of seats) have identical kinematics, especially in order to take into account unknown factors inherent in manufacturing, due to the tolerances of the components and assemblies, and which can have an effect on the profiles of the operating parameters of the motor.

According to the safety-enhancing method according to the present disclosure, the determination of the values of at least one threshold in the different positions along the movement path, is obtained during a calibration, prior to the monitoring mode, by implementing the following steps: a measurement step a) in which the at least one parameter chosen among the voltage or the intensity of the current or the speed of the motor during at least one movement of the seat or part of the seat is measured in the different positions of the seat or part of the seat along the movement path, at least in the movement direction, a step b) of determining the determined values of the at least one threshold in relation to the different positions of the seat, in the movement direction, by applying a tolerance margin relative to the values of the operating parameter detected/measured during step a).

In the case where the at least one threshold has, on the one hand, a first threshold associated with a first movement direction on the movement path of the seat or part of the seat, and on the other hand, a second threshold associated with a second movement direction on the movement path of the seat or part of the seat, the aforementioned steps a) and b) during the calibration are implemented independently for each of the two movement directions (first direction S1 and second direction S2).

In general, this calibration may be implemented in the factory by equipment that is distinct from the safety device.

However, and according to one advantageous embodiment, this calibration function may be integrated into the safety device. Thus and according to one advantageous embodiment, the control device may comprise calibration means configured for determining the values of the at least one threshold along the movement path, in the different positions of the seat or part of the seat along the movement path, at least in the movement direction, in at least one calibration mode of the control device, prior to the monitoring mode.

These calibration means enable the implementation of the following steps: a measurement step a) in which the at least one operating parameter chosen among the voltage and/or the intensity of the current and/or the speed of the motor during at least one movement of the seat or part of the seat is measured in the different positions of the seat or part of the seat along the movement path, at least in the movement direction, a step b) of determining the determined values of the at least one threshold in relation to the different positions of the seat, in the movement direction, by applying a tolerance margin relative to the values of the operating parameter detected/measured during step a).

The tolerance margin may be determined by calculation, for example by applying a multiplying factor to the measurements acquired in step a), in particular: greater than 1, as an example between 1.05 and 1.30 (in particular 1.15), for determining an upper threshold, less than 1, for example between 0.7 and 0.95 (in particular 0.85), for determining a lower threshold.

Of course, other calculation rules are possible for determining the tolerance margin, either by applying a simple raw value or by using a more complex function than a simple multiplying factor. It is still simply possible to determine this tolerance margin empirically.

The safety device (or the safety-enhancing method) is applicable to the monitoring of the movement of a seat as a whole, for example along longitudinal rails between the understructure of the frame and the frame of the vehicle under the action of the electric motor.

The safety device (or the safety-enhancing method) is also applicable to the monitoring of any part of the seat and for example, as non-limiting examples: motorized movement of the backrest, in particular by rotation of the backrest, for example with folding down the backrest against the seating portion, in particular motorized movement of the backrest only, combined motorized movement of the backrest and the seating portion, for example in the case of a folding seat with the seating portion descending when the backrest is folded against the seating portion, motorized movement of a headrest relative to the backrest, motorized movement of an armrest.

In the case of a seat with a backrest that can be folded down against the seating portion (whether the seat is configured to descend or not when folding), the safety device (or the safety-enhancing method) finds a particular application in avoiding or at the very least signaling a pinching in between the backrest and the seating portion.

In the example illustrated, the vehicle seat comprising a seating portion and a backrest, the part of the seat actuated by the motor comprises at least the backrest in order to ensure the movement of the backrest relative to the vehicle frame.

FIG. 9 schematically represents one embodiment of the safety device according to the present disclosure, which comprises a seat 1, an electric motor 2 for moving the seat or part of the seat, and a control device 3. The control device comprises as inputs a measurement $M_{Pk}$ of the current position, which in general may be obtained by any suitable measurement means, for example, an encoder, and an intensity measurement M.I. The speed of the motor may be measured or determined by a time derivative of the position.

The seat comprises a seating portion A and a backrest D, pivoting from a raised position to a position folded down towards the seating portion. The motor 2 actuates the movement of the backrest, for example by rotating the backrest, from the raised position to the folded position in the first movement direction S1. Optionally, the motor may jointly actuate the descending of the seating portion which moves from a high position when the backrest is in its raised position to a low position when the backrest is in its folded position. In the opposite movement direction, namely the second movement direction S2, the motor 2 actuates the movement of the backrest from the folded position to the raised position, and even where appropriate raises the seating portion from its low position to its high position.

Figure 1:
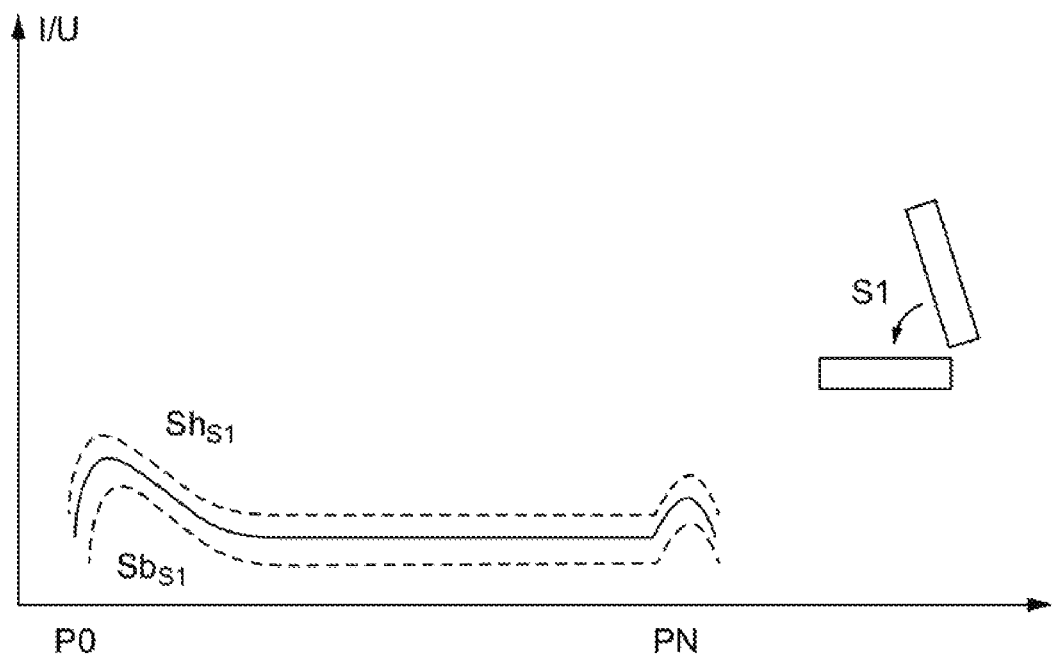

FIG. 1 shows, as an example and for explanatory purposes only, an intensity profile of the motor when the backrest is actuated in the first movement direction S1 along the movement path of the backrest from the raised position to the folded-down position.

The graph shows the intensity of the motor on the ordinate and on the abscissa the position of the seat or part of the seat on the movement path, in normal conditions of use (fluid kinematics and without pinching) during the first movement direction S1.

Note that the intensity profile of the motor, represented with solid lines, varies according to the position of the seat or part of the seat, with a high current intensity at startup (near position $P_0$), then an intensity range that is generally stable, before the intensity increases once again in the folded position due to the excess torque required to implement locking (near position $P_N$).

This intensity profile that is the subject of the graph of FIG. 1 advantageously allows calibration of the device for the determination of the first threshold (upper threshold $Sh_{S1}$ and/or lower threshold $Sb_{S1}$) associated with the first movement direction, represented in the graph of FIG. 1 by two dotted-line profiles, the upper dotted curve representing the upper threshold $Sh_{S1}$ and the lower dotted curve representing the lower threshold $Sb_{S1}$.

The diagram of FIG. 8 represents, in the block labeled MES-1, the measurement step a) in which, for FIG. 1, the intensity of the movement of the backrest is measured in the different positions of the backrest P0 to PN along the movement path, in the first movement direction S1. The CALC block represents step b) of determining the determined values of the at least one threshold in relation to the different positions of the backrest, in the first movement direction S1, by applying a tolerance margin relative to the values of the intensity parameter detected/measured during step a).

In this case, the upper threshold $Sh_{S1}$ (upper dotted curve) can be determined by calculation by applying a multiplying factor greater than 1, for example applying a factor of 1.15.

In this case, the lower threshold $Sb_{S1}$ (lower dotted curve) can be determined by calculation by applying a multiplying factor less than 1, for example a factor of 0.85.

This upper threshold $Sh_{S1}$ and the lower threshold $Sb_{S1}$ constitute a first threshold associated with the first movement direction S1, concerning the motor intensity.

Figure 2:
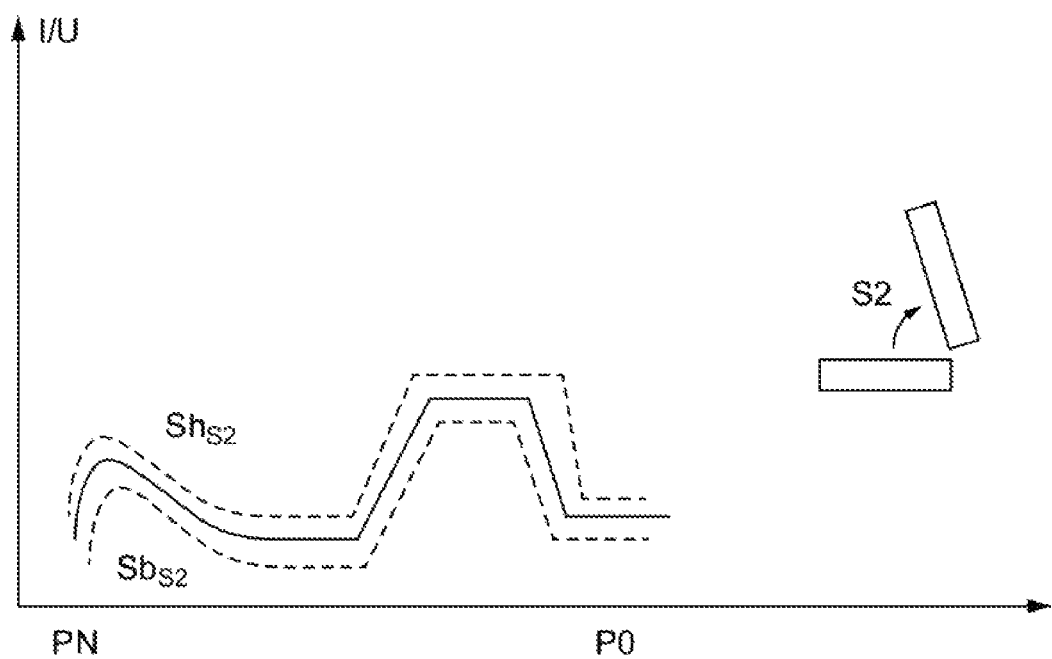

FIG. 2 represents, as an example and for explanatory purposes only, an intensity profile of the motor when the backrest is actuated in the second direction of rotation S2 on the movement path of the backrest, from the folded position towards the raised position.

The graph shows the intensity of the motor on the ordinate and on the abscissa the position of the seat or part of the seat on the movement path, in normal conditions of use (fluid kinematics and without pinching) during the second movement direction S2.

Note that the intensity profile of the motor, represented with solid lines, varies according to the position of the seat or part of the seat, with a high intensity at startup (near position PN), then a generally stable intensity, before the intensity increases once again and plateaus, the work of the motor being greater to raise the backrest, and due to the action of gravity on the seat. This intensity profile which is the subject of the graph of FIG. 2 advantageously allows calibration of the device for the determination of the second threshold (upper threshold $Sh_{S2}$ and/or lower threshold $Sb_{S2}$) associated with the second movement direction, represented in the graph of FIG. 2 by two dotted-line profiles, the upper dotted curve representing the upper threshold $Sh_{S2}$ and the lower dotted curve representing the lower threshold $Sb_{S2}$.

The diagram of FIG. 8 represents, in the block labeled MES-1, the measurement step a) in which, for FIG. 1, the intensity of the movement of the backrest is measured in the different positions of the backrest PN to P0 along the movement path, in the first movement direction S2. The CALC block represents step b) of determining the values of the at least one threshold in relation to the different positions of the backrest, in the second movement direction S2, by applying a tolerance margin relative to the values of the intensity parameter detected/measured during step a).

In this case, the upper threshold $Sh_{S2}$ (upper dotted curve) can be determined by calculation by applying a multiplying factor greater than 1, for example a factor of 1.15.

In this case, the lower threshold $Sb_{S2}$ (lower dotted curve) can be determined by calculation by applying a multiplying factor less than 1, for example a factor of 0.85.

This upper threshold $Sh_{S2}$ and the lower threshold $Sb_{S2}$ constitute a second threshold associated with the second movement direction S2, concerning the motor intensity.

FIG. 5 represents, as an example and for explanatory purposes only, a speed profile of the motor when the backrest is actuated in the first movement direction S1 on the movement path of the backrest from the raised position to the folded position and FIG. 6 represents, as an example and for explanatory purposes only, a speed profile of the motor when the backrest is actuated in the second movement direction S2 on the movement path of the backrest from the folded position to the raised position. Note that the average speed is greater in movement direction S1 than in movement direction S2 where the work of the motor contributes to the raising of the backrest.

The diagram of FIG. 8 represents, in the block labeled MES-1, the measurement step a) in which, for FIG. 5, the speed of the movement of the backrest is measured in the different positions of the backrest P0 to PN along the movement path, in the first movement direction S1. The CALC block represents step b) of determining the determined values of the at least one threshold in relation to the different positions of the backrest, in the first movement direction S1, by applying a tolerance margin relative to the values of the speed parameter detected/measured during step a).

In this case, the upper threshold $SVh_{S1}$ (upper dotted curve) can be determined by calculation by applying a multiplying factor greater than 1, for example a factor of 1.15.

In this case, the lower threshold $SVb_{S1}$ (lower dotted curve) can be determined by calculation by applying a multiplying factor less than 1, for example a factor of 0.85.

The diagram of FIG. 8 represents, in the block labeled MES-1, the measurement step a) in which, for FIG. 6, the speed of the movement of the backrest is measured in the different positions of the backrest PN to P0 along the movement path, in the second movement direction S2. The CALC block represents step b) of determining the values of the at least one threshold in relation to the different positions of the backrest, in the second movement direction S2, by applying a tolerance margin relative to the values of the speed parameter detected/measured during step a).

In this case, the upper threshold $SVh_{S2}$ (upper dotted curve) can be determined by calculation by applying a multiplying factor greater than 1, for example a factor of 1.15.

In this case, the lower threshold $SVb_{S2}$ (lower dotted line) can be determined by calculation by applying a multiplying factor less than 1, for example a factor of 0.85.

Also, and at the end of the calibration, thresholds $Sh_{S1}$, $Sb_{S1}$ and $SVh_{S1}$, $SVb_{S1}$ are available for the operating parameters—intensity and speed—forming the at least a first threshold associated with the first movement direction S1, and thresholds $Sh_{S2}$ $Sb_{S2}$ and $SVh_{S2}$, $SVb_{S2}$ for the operating parameters—intensity and speed—forming the second threshold associated with the second movement direction.

The safety enhancement according to one embodiment of the method of the present disclosure is illustrated in the continuation of the diagram of FIG. 8. The safety enhancement is provided by a control device which, in at least one monitoring mode in block MES-2, ensures the detection/measurement of the current position Pk of the backrest along the movement path during its actuation by the motor, and compares, for each of the different positions of the backrest, the current measurement of the at least operating parameter with the threshold value determined for the position associated with the current position of the backrest, and so as to set off an alarm and/or preferably stop the motor when the at least one threshold is crossed.

When the intensity measurement at the current position $M.I_{PK}$ leaves the range between the upper threshold Sh and the lower threshold Sb ($Sh_{S1}$, $Sb_{S1}$ in the first movement direction S1 or $Sh_{S2}$ $Sb_{S2}$ in the second movement direction), the control device controls the alarm and/or preferably stops the motor.

Figure 3:
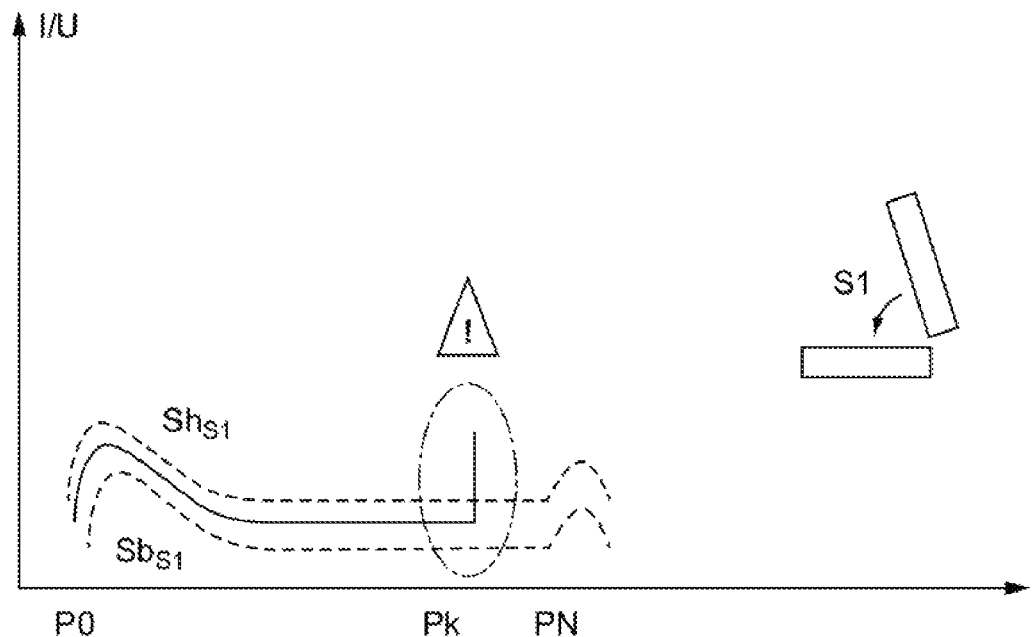
FIG. 3 shows a graph representing the intensity profile of the motor when the seat (or part of the seat) is actuated in the first direction of rotation on the movement path of the seat, in the monitoring mode of the control device, the current intensity measurement at the current position Pk exceeding the upper threshold of the first threshold, causing the motor to stop.

For example and according to the situation in FIG. 3 which represents the measurement MES-2 in monitoring mode during the first movement direction S1, it can be seen that at the current position Pk, the measured value of the intensity $M.I_{Pk}$ at the current position Pk passes above the upper threshold $Sh_{S1}$ and therefore exceeds it, the control device then controlling the stopping (step ST) of the motor, and as illustrated in the diagram of FIG. 8.

Figure 4:
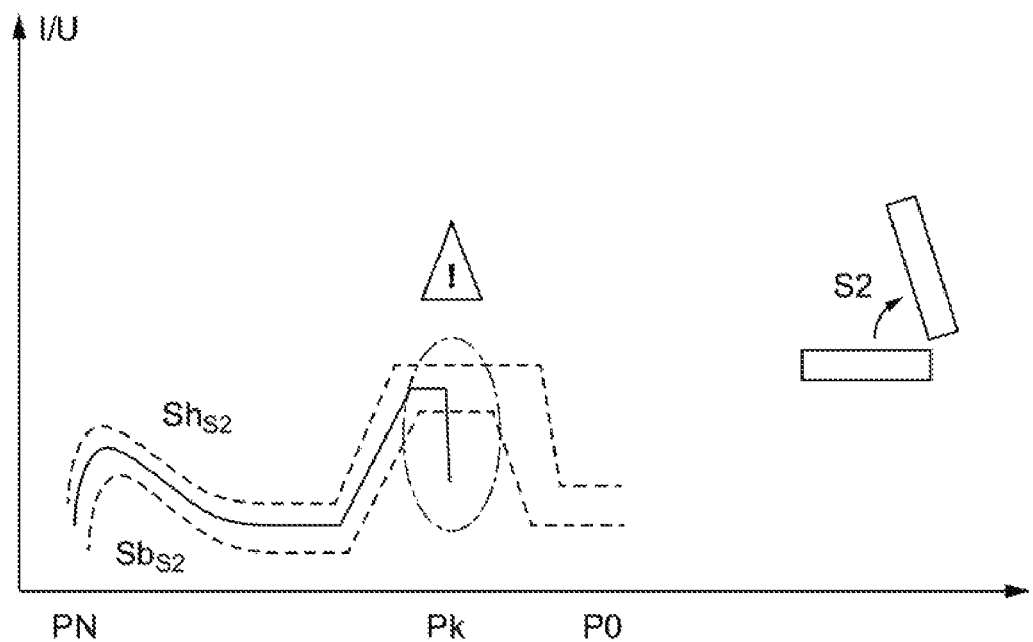
FIG. 4 shows a graph representing the intensity profile of the motor when the seat (or part of the seat) is actuated in the second direction of rotation on the movement path of the seat, in the monitoring mode of the control device, the current intensity measurement at the current position Pk falling below the lower threshold of the second threshold, causing the motor to stop.

Again, according to another situation in FIG. 4 which represents the measurement MES-2 in monitoring mode during the second movement direction S2, it can be seen that at the current position Pk, the measurement of the intensity $M.I_{Pk}$ at the current position Pk falls below the lower threshold $Sb_{S2}$, the control device then controlling the stopping (step ST) of the motor in the diagram of FIG. 8.

Again, according to another situation in FIG. 7 which represents the measurement MES-2 in monitoring mode during the first movement direction S1, it can be seen that at the current position Pk, the measured value of the speed $M.Vt_{Pk}$ at the current position Pk falls below the lower threshold $SVb_{S1}$ (abnormal drop in speed), the control device then controlling the stopping (step ST) of the motor in the diagram of FIG. 8.

FIG. 10 shows an example of the architecture of the safety device 1, comprising the electric motor 2 for moving the seat or part of the seat and the control device 3.

The control device 3 comprises a microcontroller MCU, connected to the motor board CM (circuit board) of the motor. The microcontroller MCU sends control signals to the motor board CM for controlling the rotation of the motor 2 in one direction or the other. The motor board CM sends to the microcontroller, in real time, the value(s) of the operating parameter(s) such as the intensity (limit) and/the voltage.

The microcontroller MCU itself receives control signals, for example from a user interface, for example with buttons, to enable moving the seat or part of the seat in one direction or the other, in particular according to the settings desired by the user.

The control device 3 further comprises the encoder Co used to measure the current position of the seat or part of the seat. This encoder, in particular an angle encoder, can target the rotation of the rotor of the electric motor 2. This encoder Co sends measurement signals to a board of the encoder CCo, which in turn sends a digital signal representative of the current position to the microcontroller MCU.

The control device 3 further comprises a memory for storing values of the operating parameters, in particular the intensity I, and the speed Vt and positions Pk.

In calibration mode, the microcontroller controls the movement of the seat or part of the seat from position P0 to PN, in one direction and the other, and implements the automatic learning of the values of the operating parameters such as the intensity I or the speed Vt of the motor during step a) which are stored in the memory ME as they are collected, with their associated positions Pk.

For this purpose, the microcontroller MCU records these measurements (Pk, $I_{Pk}$ and VTPk) using a sampling period Te, along the movement path of the seat or part of the seat, that is much less than the time required by the seat to travel the movement path which may be several seconds, for example 5 to 10 seconds. For example, the sampling period is less than the time required by the seat to travel the movement path, by a ratio of 10 or even a ratio of 100.

Advantageously, particularly in order to reduce the size of the memory Me, but without degrading performance, the microcontroller MCU may advantageously make use of several successive sampling periods during step a) on the movement path, including at least one sampling period Te1 near end-of-movement P0 and/or end-of-movement PN, selected to be less than sampling period Te2, used for recording the values of the operating parameters of the seat or part of the seat, on an intermediate portion of the movement path.

Thus in FIG. 11, it can be seen that the sampling period Te1 used in the movement portion near end-of-movement position P0, or even used on the movement portion of the seat near end-of-movement position PN, is of a much smaller value than the sampling period Te2 used on the intermediate portion between these two portions near the two ends-of-movement (P0 and PN). For example, the ratio of Te2/Te1 is greater than or equal to 3, or even greater than or equal to 5, or even greater than or equal to 10. Increasing the sampling frequency in these two portions near the two ends-of-movement makes it possible to increase the precision of the measurements, in particular during the starting phases of the motor or the stopping phases which have high variability in the values of the operating parameters of the motor over time.

The calibration mode may be implemented in a first movement of the seat along the movement path, and preferably in both directions in order to record the parameter values for each of the two movement directions S1, S2.

Preferably, the microcontroller can implement several movements (in both directions) in order to increase the reliability of the measurements: this makes it possible in particular to differentiate aberrational values that are too far from the other measurements, or to average the measurements.

During monitoring mode, the microcontroller MCU receives the operating parameters of the motor in real time, in particular the intensity measurement signal from the motor board CM and the position measurement signal Pk from the encoder card CCo, and monitors in real time the values of the parameters stored for this position Pk in the memory, by determining an upper and/or lower threshold value, for example by applying the multiplying factors.
The microcontroller MCU orders the motor to stop as soon as the upper threshold or the lower threshold is crossed. For example, crossing the upper intensity threshold and/or crossing the lower speed threshold indicates blockage or pinching. Conversely, crossing the lower intensity threshold and/or crossing the upper speed threshold indicates an anomaly in the seat mechanism such as breakage.

The present disclosure relates to the field of safety devices for a motor vehicle seat, in particular, but not limited to, those with an anti-pinch function, the device comprising a seat, an electric motor for moving the seat or part of the seat, and a control device configured to stop the motor if an anomaly is detected.

According to a first aspect, a safety device for a motor vehicle seat is proposed, comprising: a seat, an electric motor for moving the seat or a part of the seat, a control device configured for measuring/detecting at least one operating parameter of the motor among the voltage and/or the current of the motor and/or the speed of the motor, when the seat or the part of the seat is moving along a movement path when actuated by the motor, the control device being configured for ensuring that the motor is stopped when the at least one parameter of the current measurement crosses at least one threshold, and wherein the at least one threshold has a plurality of determined values associated with different positions of the seat or part of the seat along the movement path, at least in a movement direction of the seat or part of the seat, the control device being configured for, in at least one monitoring mode, detecting/measuring the current position of the seat or part of the seat along the movement path during its actuation by the motor, when the seat or part of the seat is moving in the movement direction, and comparing, for each of the different positions of the seat or part of the seat along the movement path, the current measurement of the at least one operating parameter of the motor with the value of the threshold associated with the operating parameter, determined for the position associated with the current position of the seat or part of the seat, and so as to set off an alarm and/or preferably stop the motor when the at least one threshold is crossed.

According to a second aspect, a method is proposed for enhancing the safety of a motor vehicle seat comprising: a seat, an electric motor for moving the seat or a part of the seat, the method measuring at least one operating parameter among the voltage and/or the current of the motor and/or the speed of the motor when the seat or the part of the seat is moving along a movement path when actuated by the motor, the method comprising at least one threshold having a plurality of determined values associated with different positions of the seat or part of the seat along the movement path, at least in a movement direction of the seat or part of the seat, and wherein the seat is made more safe by a control device which, in at least one monitoring mode, ensures the detection/measurement of the current position of the seat or part of the seat along the movement path during its actuation by the motor, and compares, for each of the different positions of the seat or part of the seat along the movement path, the current measurement of the at least one operating parameter with the value of the threshold associated with the operating parameter, determined for the position associated with the current position of the seat or part of the seat, and so as to set off an alarm and/or preferably stop the motor when the at least one threshold is crossed.

According to one embodiment of the safety-enhancing method, the determination of the values of at least one threshold, at the different positions along the movement path, is obtained during a calibration prior to the monitoring mode, by implementing the following steps: a measurement step a) in which the at least one parameter chosen among the voltage or the current or the speed of the motor during at least one movement of the seat or part of the seat is measured in the different positions of the seat or part of the seat along the movement path, at least in the movement direction, a step b) of determining the determined values of the at least one threshold in relation to the different positions of the seat, in the movement direction, by applying a tolerance margin relative to the values of the operating parameter detected/measured during step a).

According to one embodiment of the safety device, the control device can thus have calibration means configured for determining the determined values of the at least one threshold along the movement path, at the different positions of the seat or part of the seat along the movement path, at least in the movement direction, in at least one calibration mode of the control device, prior to the monitoring mode, by implementing the following steps: a measurement step a) in which the at least one operating parameter chosen among the voltage and/or the current and/or the speed of the motor is measured during at least one movement of the seat or part of the seat in the different positions of the seat or part of the seat along the movement path, at least in the movement direction, a step b) of determining the determined values of the at least one threshold in relation to the different positions of the seat, in the movement direction, by applying a tolerance margin relative to the values of the operating parameter detected/measured during step a).

According to one embodiment, the control device comprises a microcontroller recording the measurements during step a), using a sampling period, along the movement path of the seat or part of the seat, that is less than the time required by the seat (or part of the seat) to travel the movement path, by a ratio of 10, or even by a ratio of 100.

The sampling period Te1 used on the movement portions near the two end-of-movement positions is of a much smaller value than the sampling period Te2 used on the intermediate portion between the two portions near the two ends-of-movement (P0 and PN), in particular the Te2/Te1 ratio is greater than or equal to 3, or even greater than or equal to 5, or even greater than or equal to 10.

According to one embodiment, the tolerance margin in step b) is determined by calculation, by applying a multiplying factor to the measurements acquired in step a): greater than 1, between 1.05 and 1.30, for determining an upper threshold, less than 1, between 0.7 and 0.95, for determining a lower threshold.

The features disclosed in the following paragraphs may optionally be implemented for the safety device or for the safety-enhancing method. They may be implemented independently of each other or in combination with each other: the measurement step a) is carried out during the first movement of the seat or part of the seat along the movement path, or alternatively the measurement step a) is carried out over several movements of the seat or part of the seat as a function of the position of the seat or part of the seat along the movement path; the at least operating parameter comprises at least the voltage or the intensity of the current of the electric motor; the operating parameter comprises, in addition to the voltage or the intensity of the current of the electric motor, the speed of the motor; the at least one threshold comprises at least one upper threshold, the control device setting off the alarm and/or preferably stopping the motor when the operating parameter measured/detected at the current position exceeds the upper threshold; or alternatively, the at least threshold comprises at least one lower threshold, the control device setting off the alarm and/or preferably stopping the motor when the operating parameter measured/detected at the current position falls below the lower threshold; or alternatively, the threshold comprises at least one upper threshold and at least one lower threshold, the control device setting off the alarm and/or stopping the motor when the operating parameter measured/detected at the current position is outside the range between the lower threshold and the upper threshold; the determined values for the at least threshold associated with the different positions of the seat or part of the seat are variable as a function of the position of the seat or part of the seat along the movement path of the seat or part of the seat; the vehicle seat comprising a seating part and a backrest, the part of the seat actuated by the motor comprises at least the backrest in order to ensure the movement of the backrest relative to the seating part.

According to one embodiment of the safety device or of the safety-enhancing method, the values determined according to different positions of the seat or part of the seat along the movement path in the movement direction, referred to as the first movement direction, are values of a first threshold associated with the different positions of the seat in the first movement direction, a second threshold having determined values associated with the different positions of the seat or part of the seat along the movement path in a second movement direction that is opposite to the first movement direction, and wherein the control device (or the safety-enhancing method) is configured for, in the at least one monitoring mode, detecting/measuring the current position of the seat or part of the seat along the movement path, during its actuation by the motor, and comparing, for each of the different positions of the seat or part of the seat along the movement path: the current measurement of the at least one operating parameter with the value of the first threshold determined for the position associated with the current position of the seat or part of the seat when the seat or part of the seat is moving in the first movement direction, or the current measurement of the at least one operating parameter with the value of the second threshold determined for the associated position of the seat or part of the seat when the seat or part of the seat is moving in the second movement direction, and so as to set off the alarm and/or stop the motor when the at least one threshold—first threshold or second threshold—is crossed.

According to another aspect, a computer program is proposed comprising instructions for implementing some or all of a method as defined herein when this program is executed by a processor. According to another aspect, there is provided a non-transitory computer-readable storage medium on which such a program is stored.

Comparative safety devices have an anti-pinch function only, these comparative devices being configured for measuring/detecting the intensity of the motor current, and to ensure the stopping of the motor when the current measurement exceeds an upper, untreated threshold.

Some comparative seat kinematics can require significant variations in the current along the movement path of the seat or part of the seat, for example when the motor is started, or when the motor is applying force to ensure a locking function. In such a comparative case, this makes it necessary to determine an upper threshold of high value, greater than the maximum value of the current over the entire movement path of the seat, in order to ensure an anti-pinch function. However, in the case of comparative seat kinematics generating a strong current variation, this level of value is too high to ensure the anti-pinch function during all actuation phases of the seat (or part of the seat).

The following numbered clauses include embodiments that are contemplated and non-limiting:

Clause 1. A safety device for a motor vehicle seat comprising:

a seat (1), an electric motor (2) for moving the seat or a part of the seat, a control device (3) configured for measuring/detecting at least one operating parameter of the motor among the voltage (U) and/or the current (I) of the motor and/or the speed (Vt) of the motor, when the seat or the part of the seat is moving along a movement path (T) when actuated by the motor, the control device (3) being configured for ensuring that the motor is stopped when the at least one parameter of the current measurement crosses at least one threshold, and wherein the at least one threshold has a plurality of determined values associated with different positions (P0 to PN) of the seat or part of the seat along the movement path, at least in a movement direction of the seat or part of the seat, the control device being configured for, in at least one monitoring mode, detecting/measuring the current position (Pk) of the seat or part of the seat along the movement path during its actuation by the motor, when the seat or part of the seat is moving in the movement direction, and comparing, for each of the different positions (P0 to PN) of the seat or part of the seat along the movement path, the current measurement of the at least one operating parameter of the motor with the value of the threshold associated with the operating parameter, determined for the position associated with the current position (Pk) of the seat or part of the seat, and so as to set off the alarm and/or preferably stop the motor when the at least one threshold is crossed, and wherein the control device (3) has calibration means configured for determining the values of the at least one threshold along the movement path, at the different positions of the seat or part of the seat along the movement path, at least in the movement direction, in at least one calibration mode of the control device, prior to the monitoring mode, by implementing the following steps:

a measurement step a) in which the at least one operating parameter chosen among the voltage and/or the current and/or the speed of the motor is measured during at least one movement of the seat or part of the seat in the different positions of the seat or part of the seat along the movement path, at least in the movement direction, a step b) of determining the determined values of the at least one threshold in relation to the different positions of the seat, in the movement direction, by applying a tolerance margin relative to the values of the operating parameter detected/measured during step a).

Clause 2. The safety device according to clause 1, wherein the tolerance margin in step b) is determined by calculation, by applying a multiplying factor to the measurements acquired in step a):

greater than 1, between 1.05 and 1.30, for determining an upper threshold, less than 1, between 0.7 and 0.95, for determining a lower threshold.

Clause 3. The safety device according to clause 2, wherein the measurement step a) is carried out during the first movement of the seat or part of the seat along the movement path, or else the measurement step a) is carried out over several movements of the seat or part of the seat as a function of the position of the seat or part of the seat along the movement path.

Clause 4. The safety device according to clauses 1 to 3, wherein the control device (3) comprises a microcontroller MCU recording the measurements (Pk, $I_{Pk}$ and VTPk) during step a), using a sampling period along the movement path of the seat or part of the seat, that is less than the time required by the seat to travel the movement path, by a ratio of 10, or even by a ratio of 100.

Clause 5. The safety device according to clause 4, wherein the sampling period Te1 used in the movement portions near the two end-of-movement positions is of a much smaller value than the sampling period Te2 used in the intermediate portion between the two portions near the two ends-of-movement (P0 and PN), in particular the Te2/Te1 ratio is greater than or equal to 3, or even greater than or equal to 5, or even greater than or equal to 10.

Clause 6. The safety device according to clauses 1 to 5, wherein the at least one operating parameter comprises at least the voltage or the intensity of the electric motor.

Clause 7. The safety device according to clause 6, wherein the operating parameter comprises, in addition to the voltage or the intensity of the electric motor, the speed of the motor.

Clause 8. The safety device according to clauses 1 to 7, wherein the at least one threshold comprises at least one upper threshold, the control device setting off the alarm and/or stopping the motor when the operating parameter measured/detected at the current position exceeds the upper threshold.

Clause 9. The safety device according to clauses 1 to 7, wherein the at least one threshold comprises at least one lower threshold, the control device (3) setting off the alarm and/stopping the motor when the operating parameter measured/detected at the current position falls below the lower threshold.

Clause 10. The safety device according to clauses 1 to 7, wherein the threshold comprises at least one upper threshold and at least one lower threshold, the control device setting off the alarm and/or stopping the motor when the operating parameter measured/detected at the current position is outside the range between the lower threshold and the upper threshold.

Clause 11. The safety device according to clauses 1 to 10, wherein the determined values for the at least one threshold associated with the different positions of the seat or part of the seat are variable as a function of the position of the seat or part of the seat along the movement path of the seat or part of the seat.

Clause 12. The safety device according to clauses 1 to 11, wherein: the values determined according to different positions of the seat or part of the seat along the movement path in the movement direction, referred to as the first movement direction (S1), are values of a first threshold associated with the different positions of the seat in the first movement direction (S1), a second threshold having determined values associated with the different positions (P0 to PN) of the seat or part of the seat along the movement path in a second movement direction (S2) that is opposite to the first movement direction (S1), and wherein the control device (3) is configured for, in the at least one monitoring mode, detecting/measuring the current position of the seat or part of the seat along the movement path, during its actuation by the motor; and comparing, for each of the different positions of the seat or part of the seat along the movement path:

the current measurement of the at least one operating parameter with the value of the first threshold determined for the position associated with the current position of the seat or part of the seat when the seat or part of the seat is moving in the first movement direction (S1), or, the current measurement of the at least one operating parameter with the value of the second threshold determined for the position associated with the current position of the seat or part of the seat when the seat or part of the seat is moving in the second movement direction (S2), and so as to set off the alarm and/or preferably stop the motor (2) when the at least one threshold, first threshold or second threshold, is crossed.

Clause 13. The safety device according to clauses 1 to 12, wherein, the vehicle seat comprising a seating portion and a backrest, the part of the seat actuated by the motor comprises at least the backrest in order to ensure the movement of the backrest relative to the seating portion.

Clause 14. A method for enhancing the safety of a motor vehicle seat comprising:

a seat, an electric motor for moving the seat or a part of the seat, the method measuring at least one operating parameter among the voltage (U) and/or the intensity (I) of the motor and/or the speed (Vt) of the motor when the seat or the part of the seat is moving along a movement path when actuated by the motor, the method comprising at least one threshold having a plurality of determined values associated with different positions (P0 to PN) of the seat or part of the seat along the movement path, at least in one movement direction of the seat or part of the seat and wherein the seat is made more safe by a control device which, in at least one monitoring mode, ensures the detection/measurement of the current position (Pk) of the seat or part of the seat along the movement path during its actuation by the motor, and compares, for each of the different positions of the seat or part of the seat along the movement path, the current measurement of the at least one operating parameter with the value of the threshold associated with the operating parameter, determined for the position associated with the current position of the seat or part of the seat, and so as to set off an alarm and/or preferably stop the motor when the at least one threshold is crossed, and wherein the determination of the values of at least one threshold, at the different positions along the movement path, is obtained during a calibration prior to the monitoring mode, by implementing the following steps:

a measurement step a) in which the at least one parameter chosen among the voltage or the intensity of the current or the speed of the motor during at least one movement of the seat or part of the seat is measured in the different positions of the seat or part of the seat along the movement path, at least in the movement direction, a step b) of determining the determined values of the at least one threshold in relation to the different positions of the seat, in the movement direction, by applying a tolerance margin relative to the values of the operating parameter detected/measured during step a).

Clause 15. The method of clause 14, wherein the tolerance margin in step b) is determined by calculation, by applying a multiplying factor to the measurements acquired in step a):

greater than 1, between 1.05 and 1.30, for determining an upper threshold, less than 1, between 0.7 and 0.95, for determining a lower threshold.

Clause 16. The method of clauses 14 or 15, wherein the measurement step a) is carried out during the first movement of the seat or part of the seat along the movement path, or alternatively is carried out over several movements of the seat or part of the seat as a function of the position of the seat or part of the seat along the movement path.

Clause 17. The method of clauses 14 to 16, wherein a microcontroller MCU records the measurements (Pk, $I_{Pk}$ and VTPk) during step a) using a sampling period, along the movement path of the seat or part of the seat, that is less than the time required by the seat to travel the movement path, by a ratio of 10, or even by a ratio of 100.

Clause 18. The safety device of clause 17, wherein the sampling period Te1 used on the movement portions near the two end-of-movement positions is of a much smaller value than the sampling period Te2 used on the intermediate portion between the two portions near the two ends-of-movement (P0 and PN), in particular the Te2/Te1 ratio is greater than or equal to 3, or even greater than or equal to 5, or even greater than or equal to 10.

Clause 19. The method of clauses 14 to 18, wherein the at least one operating parameter comprises at least the voltage (U) or the intensity (I) of the electric motor.

Clause 20. The method of clause 19, wherein the operating parameter comprises, in addition to the voltage or the intensity (I) of the electric motor, the speed of the motor.

Clause 21. The method of clauses 14 to 20, wherein the at least one threshold comprises at least one upper threshold, the control device setting off the alarm and/or stopping the motor when the operating parameter measured/detected at the current position exceeds the upper threshold.

Clause 22. The method of clauses 14 to 20, wherein the at least one threshold comprises at least one lower threshold, the control device setting off the alarm and/or stopping the motor when the operating parameter measured/detected at the current position falls below the lower threshold.

Clause 23. The method of clauses 14 to 20, wherein the at least one threshold comprises at least one upper threshold and at least one lower threshold, the control device causing the motor to stop when the operating parameter measured/detected at the current position is outside the range between the lower threshold and the upper threshold.

Clause 24. The method of clauses 14 to 23, wherein the values determined according to different positions of the seat or part of the seat along the movement path in the movement direction, referred to as the first movement direction (S1), are values of a first threshold associated with the different positions of the seat in the first movement direction (S1), a second threshold having determined values associated with the different positions of the seat or part of the seat along the movement path in a second movement direction that is opposite to the first movement direction (S1), and wherein the control device is configured for, in the at least one monitoring mode, detecting/measuring the current position of the seat or part of the seat along the movement path, during its actuation by the motor, and comparing, for each of the different positions of the seat or part of the seat along the movement path:

the current measurement of the at least one operating parameter with the value of the first threshold determined for the position associated with the current position of the seat or part of the seat when the seat or part of the seat is moving in the first movement direction (S1), or the current measurement of the at least one operating parameter with the value of the second threshold determined for the associated position of the seat or part of the seat when the seat or part of the seat is moving in the second movement direction (S2), and so as to set off the alarm and/or preferably stop the motor when the at least one threshold—first threshold or second threshold—is crossed.

Clause 25. The method of clauses 14 to 24, wherein the determined values for the at least one threshold are variable at the different positions along the movement path of the seat or part of the seat.

Clause 26. The method of clauses 14 to 25, the vehicle seat comprising a seating portion and a backrest, the part of the seat actuated by the motor is the backrest in order to ensure the movement of the backrest relative to the seating portion.

The invention claimed is:

1. A safety device for a motor vehicle seat comprising:
a seat,
an electric motor for moving the seat or a part of the seat,
a control device configured for measuring/detecting at least one operating parameter of the motor among the voltage and/or the current of the motor and/or the speed of the motor, when the seat or the part of the seat is moving along a movement path when actuated by the motor, the control device being configured for ensuring that the motor is stopped when the at least one parameter of the current measurement crosses at least one threshold, and wherein the control device comprises:
a microcontroller connected to a circuit of the electric motor, said microcontroller being configured to send control signals to the circuit of the electric motor to control rotation of the electric motor, and to receive a signal representative of a current position of the seat or the part of the seat along the movement path, the circuit of the electric motor is connected to the microcontroller, the circuit configured to send to the microcontroller values of operating parameters, and
a memory that is readable and writable by the microcontroller,
wherein the at least one threshold has a plurality of determined values associated with different positions of the seat or part of the seat along the movement path, at least in a movement direction of the seat or part of the seat, the control device being configured for, in at least one monitoring mode, detecting/measuring the current position of the seat or part of the seat along the movement path during its actuation by the motor, when the seat or part of the seat is moving in the movement direction, and comparing, for each of the different positions of the seat or part of the seat along the movement path, the current measurement of the at least one operating parameter of the motor with the value of the threshold associated with the operating parameter, determined for the position associated with the current position of the seat or part of the seat, and so as to stop the motor when the at least one threshold is crossed, and wherein the control device has calibration means configured for determining the values of the at least one threshold along the movement path, at the different positions of the seat or part of the seat along the movement path, at least in the movement direction, in at least one calibration mode of the control device, prior to the monitoring mode, by implementing the following steps: a measurement step a) in which the at least one operating parameter chosen among the voltage and/or the current and/or the speed of the motor is measured during at least one movement of the seat or part of the seat in the different positions of the seat or part of the seat along the movement path, at least in the movement direction, said microcontroller controlling said at least one movement of the seat or part of the seat, and implementing an automatic learning of the at least one operating parameter that are read from the circuit of the electric motor and which are written and stored in the memory of the control device in relation to the different positions of the seat or part of the seat along the movement path, a step b) of determining the determined values of the at least one threshold in relation to the different positions of the seat, in the movement direction, said control device applying a tolerance margin relative to the values of the operating parameter detected/measured during step a).

2. The safety device of claim 1, wherein the tolerance margin in step b) is determined by calculation, by applying a multiplying factor to the measurements acquired in step a): greater than 1, between 1.05 and 1.30, for determining an upper threshold, less than 1, between 0.7 and 0.95, for determining a lower threshold.

3. The safety device of claim 2, wherein the measurement step a) is carried out during the first movement of the seat or part of the seat along the movement path, or else the measurement step a) is carried out over several movements of the seat or part of the seat as a function of the position of the seat or part of the seat along the movement path.

4. The safety device of claim 1, wherein the control device comprises a microcontroller MCU recording the measurements during step a), using a sampling period along the movement path of the seat or part of the seat, that is less than the time required by the seat to travel the movement path, by a ratio of 100.

5. The safety device of claim 4, wherein the sampling period Te1 used in the movement portions near the two end-of-movement positions is of a much smaller value than the sampling period Te2 used in the intermediate portion between the two portions near the two ends-of-movement, the Te2/Te1 ratio being greater than or equal to 3.

6. The safety device of claim 1, wherein the at least one operating parameter comprises at least the voltage or the intensity of the electric motor.

7. The safety device of claim 6, wherein the operating parameter comprises, in addition to the voltage or the intensity of the electric motor, the speed of the motor.

8. The safety device of claim 1, wherein the at least one threshold comprises at least one upper threshold, the control device setting off the alarm and/or stopping the motor when the operating parameter measured/detected at the current position exceeds the upper threshold.

9. The safety device of claim 1, wherein the at least one threshold comprises at least one lower threshold, the control device setting off the alarm and/stopping the motor when the operating parameter measured/detected at the current position falls below the lower threshold.

10. The safety device of claim 1, wherein the threshold comprises at least one upper threshold and at least one lower threshold, the control device setting off the alarm and/or stopping the motor when the operating parameter measured/detected at the current position is outside the range between the lower threshold and the upper threshold.

11. The safety device of claim 1, wherein the determined values for the at least one threshold associated with the different positions of the seat or part of the seat are variable as a function of the position of the seat or part of the seat along the movement path of the seat or part of the seat.

12. The safety device of claim 1, wherein the values determined according to different positions of the seat or part of the seat along the movement path in the movement direction, referred to as the first movement direction, are values of a first threshold associated with the different positions of the seat in the first movement direction, a second threshold having determined values associated with the different positions of the seat or part of the seat along the movement path in a second movement direction that is opposite to the first movement direction, and wherein the control device is configured for, in the at least one monitoring mode, detecting/measuring the current position of the seat or part of the seat along the movement path, during its actuation by the motor; and comparing, for each of the different positions of the seat or part of the seat along the movement path:

the current measurement of the at least one operating parameter with the value of the first threshold determined for the position associated with the current position of the seat or part of the seat when the seat or part of the seat is moving in the first movement direction, or, the current measurement of the at least one operating parameter with the value of the second threshold determined for the position associated with the current position of the seat or part of the seat when the seat or part of the seat is moving in the second movement direction, and so as to stop the motor when the at least one threshold, first threshold or second threshold, is crossed.

13. The safety device of claim 1, wherein, the vehicle seat comprising a seating portion and a backrest, the part of the seat actuated by the motor comprises at least the backrest in order to ensure the movement of the backrest relative to the seating portion.

14. A method for enhancing the safety of a motor vehicle seat comprising a seat and an electric motor for moving the seat or a part of the seat, the method measuring at least one operating parameter among the voltage and/or the intensity of the motor and/or the speed of the motor when the seat or the part of the seat is moving along a movement path when actuated by the motor, the method comprising at least one threshold having a plurality of determined values associated with different positions of the seat or part of the seat along the movement path, at least in one movement direction of the seat or part of the seat and wherein the seat is made more safe by a control device, and wherein the control device comprises:
a microcontroller connected to a circuit of the electric motor, said microcontroller being configured to send control signals to the circuit of the electric motor to control rotation of the electric motor, and to receive a signal representative to a current position of the seat or the part of the seat along the movement path, the circuit of the electric motor is connected to the microcontroller, the circuit configured to send to the microcontroller a value of operating parameters, and
a memory that is readable and writable by the microcontroller,
said control device, in at least one monitoring mode, ensures the detection/measurement of the current position of the seat or part of the seat along the movement path during its actuation by the motor, and compares, for each of the different positions of the seat or part of the seat along the movement path, the current measurement of the at least one operating parameter with the value of the threshold associated with the operating parameter, determined for the position associated with the current position of the seat or part of the seat, and so as to stop the motor when the at least one threshold is crossed,
and wherein the determination of the values of at least one threshold, at the different positions along the movement path, is obtained during a calibration prior to the monitoring mode, said control device implementing the following steps:
a measurement step a) in which the at least one parameter chosen among the voltage or the intensity of the current or the speed of the motor during at least one movement of the seat or part of the seat is measured in the different positions of the seat or part of the seat along the movement path, at least in the movement direction, said microcontroller controlling said at least one movement of the seat or part of the seat, and implementing an automatic learning of the operating parameters that are read from the circuit of the electric motor and which are written and stored in the memory in relation to the different positions of the seat or part of the seat along the movement path,
a step b) of determining the determined values of the at least one threshold in relation to the different positions of the seat, in the movement direction, said control device applying a tolerance margin relative to the values of the operating parameter detected/measured during step a).

15. The method of claim 14, wherein the tolerance margin in step b) is determined by calculation, by applying a multiplying factor to the measurements acquired in step a): greater than 1, between 1.05 and 1.30, for determining an upper threshold, less than 1, between 0.7 and 0.95, for determining a lower threshold.

16. The method of claim 14, wherein the measurement step a) is carried out during the first movement of the seat or part of the seat along the movement path, or alternatively is carried out over several movements of the seat or part of the seat as a function of the position of the seat or part of the seat along the movement path.

17. The method of claim 14, wherein a microcontroller MCU records measurements during step a) using a sampling period, along the movement path of the seat or part of the seat, that is less than the time required by the seat to travel the movement path, by a ratio of 100.

18. A safety device according to claim 17, wherein the sampling period Te1 used on the movement portions near the two end-of-movement positions is of a much smaller value than the sampling period Te2 used on the intermediate portion between the two portions near the two ends-of-movement, in particular the Te2/Te1 ratio is greater than or equal to 3.

19. The method of claim 14, wherein the at least one operating parameter comprises at least the voltage or the intensity of the electric motor.

20. The method of claim 19, wherein the operating parameter comprises, in addition to the voltage or the intensity of the electric motor, the speed of the motor.

21. The method of claim 14, wherein the at least one threshold comprises at least one upper threshold, the control device stopping the motor when the operating parameter measured/detected at the current position exceeds the upper threshold.

22. The method of claim 14, wherein the at least one threshold comprises at least one lower threshold, the control device stopping the motor when the operating parameter measured/detected at the current position falls below the lower threshold.

23. The method of claim 14, wherein the at least one threshold comprises at least one upper threshold and at least one lower threshold, the control device causing the motor to stop when the operating parameter measured/detected at the current position is outside the range between the lower threshold and the upper threshold.

24. The method of claim 14, wherein the values determined according to different positions of the seat or part of the seat along the movement path in the movement direction, referred to as the first movement direction, are values of a first threshold associated with the different positions of the seat in the first movement direction, a second threshold having determined values associated with the different positions of the seat or part of the seat along the movement path in a second movement direction that is opposite to the first movement direction (S1), and wherein the control device is configured for, in the at least one monitoring mode, detecting/measuring the current position of the seat or part of the seat along the movement path, during its actuation by the motor, and comparing, for each of the different positions of the seat or part of the seat along the movement path:
the current measurement of the at least one operating parameter with the value of the first threshold determined for the position associated with the current position of the seat or part of the seat when the seat or part of the seat is moving in the first movement direction, or
the current measurement of the at least one operating parameter with the value of the second threshold determined for the associated position of the seat or part of the seat when the seat or part of the seat is moving in the second movement direction,
and so as to set off the alarm and/or preferably stop the motor when the at least one threshold—first threshold or second threshold—is crossed.

25. The method of claim 14, wherein the determined values for the at least one threshold are variable at the different positions along the movement path of the seat or part of the seat.

26. The method of claim 14, the vehicle seat comprising a seating portion and a backrest, the part of the seat actuated by the motor is the backrest in order to ensure the movement of the backrest relative to the seating portion.

\* \* \* \* \*